(12) United States Patent
Tsumiyama

(10) Patent No.: US 6,555,647 B2
(45) Date of Patent: Apr. 29, 2003

(54) PROCESS FOR PRODUCTION OF POLYIMIDE MOLDED BODIES AND POLYIMIDE MOLDED BODIES

(75) Inventor: Tatsuo Tsumiyama, Ube (JP)

(73) Assignee: Ube Industries, Ltd., Ube (JP)

( * ) Notice: Subject to any disclaimer, the term of this patent is extended or adjusted under 35 U.S.C. 154(b) by 0 days.

(21) Appl. No.: 09/907,898

(22) Filed: Jul. 19, 2001

(65) Prior Publication Data

US 2002/0037995 A1 Mar. 28, 2002

(30) Foreign Application Priority Data

Jul. 21, 2000 (JP) ........................................ 2000-220274

(51) Int. Cl.$^7$ ............................ C08F 6/00; C08G 69/28; C08G 69/00
(52) U.S. Cl. ................ 528/480; 528/483; 528/502 C; 528/502 R; 528/503; 264/319; 264/320
(58) Field of Search .................. 528/480, 483, 528/503, 502 R, 502 C; 264/319, 320

(56) References Cited

U.S. PATENT DOCUMENTS 4,622,384 A * 11/1986 Manwiller .................. 528/353
4,755,428 A * 7/1988 Noda et al. .................. 428/402
5,898,048 A 4/1999 Yamaguchi et al. ........ 528/353

FOREIGN PATENT DOCUMENTS

| JP | 57 200452 | 12/1982 |
| JP | 57 200453 | 12/1982 |
| JP | 63 081160 | 4/1988 |
| JP | 64 87307 | 3/1989 |
| JP | 01 266134 | 10/1989 |

* cited by examiner

Primary Examiner—P. Hampton-Hightower
(74) Attorney, Agent, or Firm—Morgan, Lewis & Bockius LLP

(57) ABSTRACT

A process for production of polyimide molded bodies which comprises a step in which a polyimide resin powder obtained by polymerization and imidation of p-phenylenediamine with 3,3',4,4'-biphenyltetracarboxylic acid, its ester or its dianhydride and 2,3,3',4'-biphenyltetracarboxylic acid, its ester or its dianhydride is molded at a pressure of approximately 3,000–5,000 kgf/cm$^2$, and a step in which it is calcined at about 460–550° C. under low pressure. The polyimide molded bodies obtained thereby have a density in the range of 1.28–1.34 g/cm$^3$.

16 Claims, 1 Drawing Sheet

PROCESS FOR PRODUCTION OF POLYIMIDE MOLDED BODIES AND POLYIMIDE MOLDED BODIES

BACKGROUND OF THE INVENTION

1. Field of the Invention

The present invention relates to a process for production of biphenyl tetracarboxylic acid-based polyimide molded bodies with satisfactory molded body properties and high productivity, and to the polyimide molded bodies produced thereby.

2. Description of the Related Art

Pyromellitic acid-based polyimide powder molded bodies obtained from a pyromellitic acid component and 4,4'-diaminodiphenylene ether have been widely used in the prior art as polyimide powder molded bodies because of their high toughness and satisfactory cutting workability.

However, pyromellitic acid-based polyimide molded bodies have high moisture absorption, considerable out gas and low chemical resistance and dimensional stability.

3,3',4,4'-biphenyltetracarboxylic acid-based polyimide powder molded bodies have therefore been proposed.

Examples of such 3,3',4,4'-biphenyltetracarboxylic acid-based polyimide powder molded bodies are described, for example, in Japanese Unexamined Patent Publication No. 57-200452 (Japanese Examined Patent Publication No. 2-48571) and Japanese Unexamined Patent Publication No. 57-200453, wherein there are obtained heated/compressed molded bodies of aromatic polyimide powder with an imidation rate of 95% or greater obtained by polymerization and imidation of a 3,3',4,4'-biphenyltetracarboxylic acid component and an aromatic diamine component in N-methyl-2-pyrrolidone.

Also, polyimide powder molded bodies containing inorganic powder such as fine particulate graphite are described in Japanese Unexamined Patent Publication No. 63-81160.

According to these publications, these polyimide powder molded bodies exhibit excellent mechanical strength.

However, high-strength polyimide powder molded bodies with high heat resistance have been shown to have certain drawbacks, possibly due to their low elongation, such as breakage during molding and poor suitability for molding into complex shapes, when the molded bodies are subjected to secondary working into various shapes by cutting or the like; in other words, their toughness and cutting workability are low.

For this reason, it has been attempted to improve the powder fusing properties during hot compression molding in order to increase the elongation and mechanical strength of the molded bodies.

For example, a method of compression molding of polyimide powder obtained by mixing a thermoplastic polyimide with a polyimide obtained from a 3,3',4,4'-biphenyltetracarboxylic acid component and an aromatic diamine component has been attempted, but this has been associated with problems such as difficulty in obtaining a uniform mixture of the two components with completely different properties, the fact that the mechanical strength and elongation of the resulting molded bodies have still not reached a satisfactory level, and the fact that the heat resistance is instead reduced.

It has also been attempted to first extract polyamic acid powder (aggregates) and subject it to heating, drying and pulverization to obtain polyimide powder, and then subject this to compression molding to obtain a molded body. However, it has been found difficult to control the heating temperature for the polyamic acid powder aggregates, while metal impurities also tend to be included in the polyamic acid powder, so that the process is not practical.

There have hence been proposed processes for high-temperature, high-pressure hot compression molding of polyimide resin powders obtained by polymerization and imidation of phenylenediamine with 3,3',4,4'-biphenyltetracarboxylic acid, its ester or its dianhydride and 2,3,3',4'-biphenyltetracarboxylic acid, its ester or its dianhydride, for example, a process for production of polyimide molded bodies involving simultaneous hot compression at a molding temperature of 450° C. and a molding pressure of 3,000 kgf/cm$^2$.

The polyimide molded bodies obtained by this molded body production process exhibit satisfactory properties, but also have low productivity and therefore exhibit problems in terms of cost for mass production.

Furthermore, when the process is applied directly for a CIP method, the molded bodies have low strength.

BRIEF SUMMARY OF THE INVENTION

It is therefore an object of the present invention to provide a process for production of polyimide molded bodies that exhibit improvement in the properties of high moisture absorption, considerable out gas and low chemical resistance and dimensional stability exhibited by pyromellitic acid-based polyimide powder molded bodies comprising a pyromellitic acid component and 4,4'-diaminodiphenyl ether, while also exhibiting high productivity, as well as the polyimide molded bodies obtained by the process.

In other words, the invention provides a process for production of polyimide molded bodies which comprises a step in which a polyimide resin powder obtained by polymerization and imidation of p-phenylenediamine with 3,3',4,4'-biphenyltetracarboxylic acid, its ester or its dianhydride and 2,3,3',4'-biphenyltetracarboxylic acid, its ester or its dianhydride is molded at a pressure of approximately 3,000–5,000 kgf/cm$^2$, and a step in which it is calcined at about 460–550° C. under low pressure.

The invention further provides a polyimide molded body produced by the aforementioned process wherein the density of the molded body is in the range of 1.28–1.34 g/cm$^3$.

The invention still further provides a polyimide molded body which is obtained by molding polyimide powder containing at least 70 mole percent of a 3,3',4,4'-biphenyltetracarboxylic dianhydride component and at least 70 mole percent of a phenylenediamine component, by a molding method involving the CIP method, and which has a flexural strength of approximately 85 MPa or greater.

The invention still further provides a process for production of polyimide molded bodies which comprises molding polyimide powder containing at least 70 mole percent of a 3,3',4,4'-biphenyltetracarboxylic dianhydride component and at least 70 mole percent of a phenylenediamine component, by a molding method involving the CIP method, wherein the resulting molded bodies have a flexural strength of approximately 85 MPa or greater.

Figure 1:
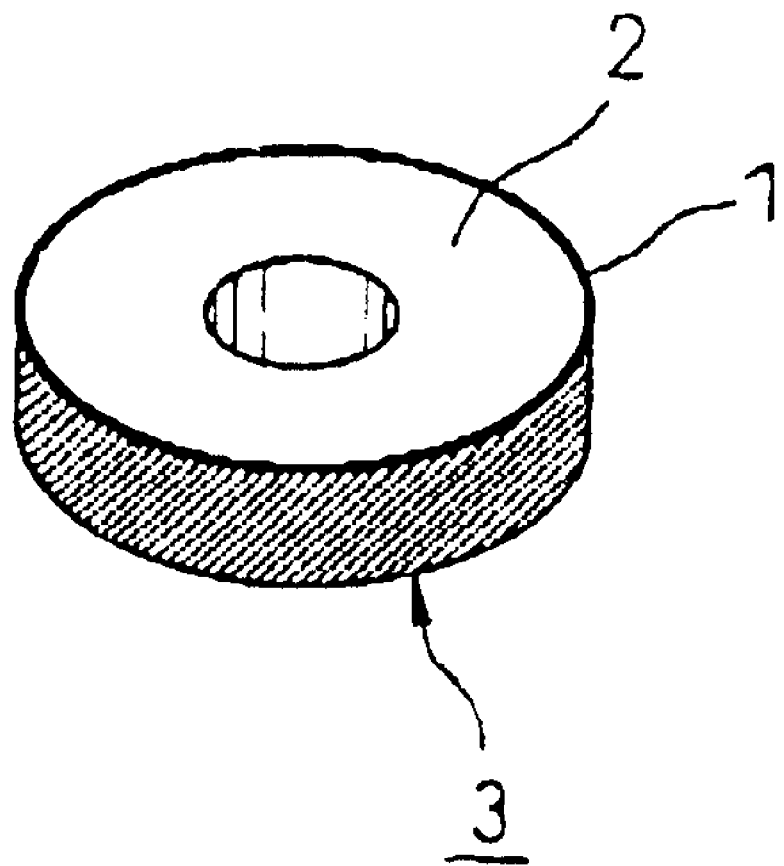
FIG. 1 is a perspective view of a grinder prepared in an example.

In the drawing, 1 denotes an abrasive grain layer, 2 denotes a grinder substrate, and 3 denotes a grinder.

DETAILED DESCRIPTION OF THE INVENTION

Preferred embodiments of the invention will now be explained in detail.

1) The aforementioned process for production of polyimide molded bodies wherein the proportion of aromatic tetracarboxylic acid components of the polyimide resin is 85–97 mole percent of a 3,3',4,4'-biphenyltetracarboxylic acid component and 15-3 mole percent of a 2, 3, 3',4'-biphenyltetracarboxylic acid component.

2) The aforementioned process for production of polyimide molded bodies wherein the step of molding at a pressure of approximately 3,000–5,000 kgf/cm$^2$ is carried out by the CIP (cold isostatic pressure) method.

3) The aforementioned process for production of polyimide molded bodies wherein the CIP method is a wet CIP method or a dry CIP method.

4) The aforementioned process for production of polyimide molded bodies wherein the step of calcination at about 460–550° C. and especially 470–550° C. is carried out under atmospheric pressure.

5) The aforementioned process for production of polyimide molded bodies wherein the step of calcination at about 460–550° C. and especially 470–550° C. is carried out in a nonreactive gas flow.

6) The aforementioned process for production of polyimide molded bodies wherein the step of calcination at about 460–550° C. is carried out while raising the temperature to about 460° C. or above at a temperature elevating rate of 0.5–10° C./min.

7) The aforementioned process for production of polyimide molded bodies wherein the body molding is followed by heating at 100–350° C. for approximately 30 minutes to 24 hours for stress relaxation treatment.

According to the invention, the polyimide powder used is a polyimide resin powder preferably obtained by polymerization and imidation of 3,3',4,4'-biphenyltetracarboxylic acid, its ester or its dianhydride and 2,3,3',4'-biphenyltetracarboxylic acid, its ester or its dianhydride with p-phenylenediamine and/or m-phenylenediamine.

The polyimide powder preferably has a structure wherein at least part of and preferably the entire surface of the solid portion composed mainly of an aromatic polyimide with high heat resistance, and preferably a crystalline aromatic polyimide with high heat resistance, preferably with no observed glass transition point (Tg) in the temperature range from room temperature to 400° C., is covered with a thin layer of an amorphous polyimide.

When this polyimide powder is used, it is believed that the polymer softening on the surfaces of the powder particles is sufficient during molding and mutual bonding occurs, thus giving a molded body with a high level balance between heat resistance, mechanical strength and elongation.

Furthermore, since the polyimide powder uses biphenyltetracarboxylic acids and phenylenediamine as the essential starting materials, the resulting molded body has low moisture absorption and high chemical resistance.

The above-mentioned aromatic polyimide powder is preferably obtained by polymerization and imidation of an aromatic tetracarboxylic acid component including 3,3',4,4'-biphenyltetracarboxylic acid, its dianhydride or an ester of the acid and a lower alcohol of no greater than 3 carbons, and 2,3,3',4'-biphenyltetracarboxylic acid, its dianhydride or an ester of the acid and a lower alcohol of no greater than 3 carbons (an acid anhydride is preferred in both cases), with the 2,3,3',4'-biphenyltetracarboxylic acid in a proportion of at least about 3 mole percent and no greater than 15 mole percent with respect to the total tetracarboxylic acid component, with phenylenediamine [para- and/or meta-, i.e. p-phenylenediamine m-phenylenediamine (molar ratio)= 100:0–0:100, and preferably p-phenylenediamine:m-phenylenediamine (molar ratio)=98:2–0:100] and in some cases an additional aromatic tetracarboxylic acid dianhydride and an additional aromatic diamine in a range which produces no adverse effect, in roughly equimolar amounts in an organic polar solvent, by a known method.

The polyimide powder preferably has a mean particle size (primary particles) of about 1–20 µm in terms of the polymer weight, and more preferably the polyimide powder does not contain particles having a mean particle size of more than 32 µm. The particles having a mean particle size of more than 32 µm may be excluded by classification.

According to the process described above, after polymerization and imidation while producing fine particles of the crystalline aromatic polyimide, the amorphous polyimide is preferably insolubilized to precipitate the polyimide particles, and then the product collected to easily obtain uniform polyimide particles with low residual reaction solvent, as a polyimide powder with a two-layer structure.

According to the polyimide powder production process, a high proportion of amorphous polyimide produces more aggregates of the polyimide particles, often resulting in inferior properties of the obtained molded bodies.

As the aforementioned additional aromatic tetracarboxylic acid there may be mentioned pyromellitic acid or its dianhydride, 3,3',4,4'-benzophenonetetracarboxylic acid or its dianhydride, 2,2'-bis(3,4-dicarboxyphenyl)propane or its dianhydride, bis(3,4-dicarboxyphenyl)methane or its dianhydride and bis(3,4-dicarboxyphenyl)ether or its dianhydride. The proportion of the additional aromatic tetracarboxylic acid component is preferably no greater than 30 mole percent in the aromatic tetracarboxylic acid component.

As the aforementioned additional aromatic diamine there may be mentioned 4,4'-diaminodiphenylether, 4,4'-diaminodiphenylmethane, 4,4'-diaminodiphenylpropane, 1,4-bis (4-aminophenoxy)benzene and 1,3-bis(4-aminophenoxy) benzene. The proportion of the additional aromatic diamine is preferably no greater than 30 mole percent in the aromatic diamine component.

The aromatic polyimide powder is produced, for example, by adding approximately equimolar amounts of the aforementioned aromatic tetracarboxylic acid component and aromatic diamine component to a reaction solvent comprising an amide-based solvent at 15–100 wt % and a non-amide-based solvent with a boiling point of 180° C. or higher at 85-0 wt % and containing 100 ppm to 5 wt % of water, in the presence of an inert gas, preferably for a total monomer content of 2–25 wt % in the solvent, raising the temperature while distilling off the water produced, precipitating fine particles at a temperature in a range from 100° C. to below 180° C. and continuing the reaction for 0.5–20 hours in a temperature range of 160–250° C. to obtain a polyimide powder with an inherent viscosity (30° C., 0.5 g/100 ml concentrated sulfuric acid) of 0.2–1.5 and an imidation rate of 95% or greater. The total monomer content is preferably not greater than 25 wt %, because the produced polyimide particles will aggregate together resulting in lower properties of the molded bodies.

The non-amide-based solvent and water may be used as a mixed solvent prior to the polyamic acid synthesis, or they may be added to the reaction solution after the polyamic acid synthesis.

Prior to the stage of fine particle precipitation and after adjustment of the reaction solution temperature from 100° C. to below 180° C., an imidation catalyst, preferably an imidazole-based imidation catalyst, may be added to the reaction system and imidation carried out under the heating conditions described above for adjustment of the imidation rate, to modify the particle size and particle size distribution of the produced polyimide powder.

The amide-based solvent used may be N-methyl-2-pyrrolidone, N,N-dimethylacetamide, N,N-dimethylformamide or N-methylcaprolactam, and is preferably N-methyl-2-pyrrolidone.

The method of obtaining the polyimide powder after completion of the imidation reaction is not particularly restricted, and for example, the method adopted may involve filtration of the aromatic polyimide powder from the reaction mixture either directly or after cooling to room temperature, and then washing of the powder with a solvent and drying.

The washing solvent may be any low boiling point solvent capable of replacing the reaction solvent, with water or an alcohol such as methanol, ethanol or isopropanol (IPA), and especially IPA, being particularly preferred.

The drying is preferably carried out at 250° C. or below, either at ordinary pressure or under reduced pressure, with heating for at least one hour preferably at 200° C. or below, to a dried state with a weight reduction of 1% or lower and especially 0.5% or lower, by heating at 350° C. for at least one hour.

The aromatic polyimide powder need not be pulverized, but it may be pulverized with a Renschel mixer, Willy mill or the like. The small amount of aggregate produced during polymerization may be separated and removed by vibration straining.

According to the invention, a polyimide powder molded body is produced by a step of molding the polyimide resin powder at a pressure of approximately 3,000 to approximately 5,000 kgf/cm$^2$ followed by a step of calcination at about 460–550° C. at low pressure.

For molding of the polyimide resin powder at a pressure of approximately 3,000 to approximately 5,000 kgf/cm$^2$, the polyimide resin powder is molded into the desired shape by a combination of uniaxial pressing and CIP molding or by CIP molding alone, at from room temperature to 200° C., and preferably room temperature. The CIP molding method applied according to the invention may be either a wet CIP method (batch system) or dry CIP method (allowing continuous molding).

According to the invention, the polyimide resin powder body which has been molded at low temperature is then calcined preferably at a low pressure of 0.5–10 atmospheres and especially under atmospheric pressure, at about 460–550° C. and especially 470–550° C., and under a nonreactive gas stteam of preferably nitrogen gas, helium gas or the like.

The step of calcination at about 460–550° C. is preferably accomplished by raising the temperature to about 460° C. or higher at a temperature elevating rate of 0.5–10° C./min. The heating time at the temperature within this range is preferably about 5–30 minutes.

The molded body which has been hot molded under atmospheric pressure is preferably cooled at a cooling rate of 0.5–10° C./min in the calcination furnace to enhance the properties of the molded body. The rate is preferably not lower than 0.5° C./min because too much time will be required, and it is preferably not higher than 10° C./min because problems such as cracking of the molded body during cooling may occur.

After molding of a member according to the process of the invention, it is preferably heated at 100–350° C. for about 30 minutes to 24 hours for stress relaxation treatment to avoid dimensional changes in the polyimide molded body.

Also, for production of the powder molded body, a filler of any type, for example, an inorganic filler such as artificial diamond, silica, mica, kaolin, talc, boron nitride, aluminum oxide, iron oxide, graphite, molybdenum sulfide or iron sulfide, or an organic filler such as a fluorine resin, may be mixed with the polyimide powder.

The filler addition may be accomplished by mixing using any internal addition or external addition method.

Polyimide molded bodies obtained by the process of the invention have the excellent heat resistance and dimensional stability of conventional publicly known polyimide powder molded bodies obtained by hot compression molding of 3,3',4,4'-biphenyltetracarboxylic acids and phenylenediamine, as well as satisfactory elongation, low moisture absorption, good dimensional stability and high productivity.

The polyimide molded bodies of the invention are preferably made by molding polyimide powder comprising at least 70 mole percent of a 3,3',4,4'-biphenyltetracarboxylic dianhydride component and at least 70 mole percent of a para- or meta-phenylenedianine component by a molding method involving the CIP method, and they exhibit a flexural strength of approximately 85 MPa or greater and especially approximately 90 MPa or greater.

The polyimide molded bodies of the invention can be used as molded bodies for various members in the field of discharge treatment which require low out gas and satisfactory heat resistance, chemical resistance and dimensional stability (after high temperature treatment and washing).

The polyimide molded bodies of the invention can also be used as molded bodies in optical fields which require low out gas and satisfactory abrasive properties (heat resistance).

The polyimide molded bodies of the invention may have vacuum gas discharge properties (300° C.) of about 10 ×10$^{-6}$ Torr·l/sec·cm$^2$ or less, preferably about 4×10$^{-6}$ Torr·l/sec·cm$^2$ or less.

The polyimide molded bodies of the invention may still further be used as inner members of semiconductor manufacturing apparatuses which require plasma resistance, vacuum properties, rigidity, machining workability and heat resistance.

Examples of the invention will now be provided. The properties of each of the polyimide powder molded bodies discussed in these examples were measured by the following test methods.

Tensile properties: Measured according to ASTM D-638.

Flexural properties; Measured according to ASTM D-790.

Linear expansion coefficient: Measured according to ASTM D-696.

Thermal deformation temperature: Measured according to ASTM D-648.

Vacuum gas discharge property: An EMD-WA1000 high precision thermal desorption gas analyzer by Denshi Kagaku Co., Ltd. was used for measurement of the ultimate vacuum at 300° C.

EXAMPLE 1

In a four-necked flask equipped with a thermometer, stirrer, nitrogen inlet tube and aquameter, nitrogen gas was blown through while reacting dried 2,3,3',4'-biphenyltetracarboxylic acid dianhydride (a-BPDA) and 3,3',4,4'-biphenyltetracarboxylic acid dianhydride (s-BPDA) in a molar ratio of a-BPDA/s-BPDA=7/93, using p-phenylenediamine as the diamine and NMP as the polymerization solvent, with a polymer concentration of ail 17 wt %, a temperature of 195° C. and a time of 4 hours.

The light yellow polyimide resin particles dispersed in the N-methyl-2-pyrrolidone (NMP) solution were recovered by filtration, and these were washed 3 times with a 4-fold volume of thermal ionization water and once with a 4-fold volume of IPA, and then dried under reduced pressure at 200° C. to obtain polyimide resin particles with an inherent viscosity (30° C., 0.5 g/100 ml concentrated sulfuric acid) of 1.28 and an imidation rate of at least 95%.

Observation of the obtained polyimide resin particles with a transmission electron microscope revealed a two-layer structure wherein the entire surfaces of the polyimide particles were covered with a coating layer made of amorphous polyimide, no glass transition point was observed up to 400° C., and the mean particle size was 11.4 $\mu$m.

The obtained polyimide resin particles were first molded into a 100 mm×100 mm×10 mm (thickness) preform with a uniaxial press at a pressure of approximately 1,000 kgf/cm$^2$ (98 MPa) and then the preform was vacuum encapsulated in a rubber bag and a wet CIP apparatus by Kobe Steel Co., Ltd. was used for CIP molding at room temperature and a pressure of approximately 3 ton/cm$^2$ (294 MPa).

Upon simultaneous non-pressurized calcination of 50 of the CIP molded bodies at 500° C. in a nitrogen gas stream, a polyimide molded body with satisfactory properties was obtained.

The properties of the obtained molded body were as follows.

| Polyimide molded body properties: | |
|---|---|
| Elongation: | 4.4% |
| Molded body density: | 1.29 g/cm$^3$ |
| Flexural strength: | 98 MPa |
| Linear expansion coefficient (25–450° C.): | 50 ppm/° C. |
| Thermal deformation temperature: | 485° C. |
| Vacuum gas discharge properties (300° C.): | 3.3 × 10$^{-6}$ Torr · l/sec · cm$^2$ |

EXAMPLE 2

A molded body was obtained in the same manner as Example 1, except that the pressure during wet CIP molding was approximately 5 ton/cm$^3$ (490 MPa).

The properties of the obtained molded body were as follows.

| Polyimide molded body properties: | |
|---|---|
| Elongation: | 4.3% |
| Molded body density: | 1.33 g/cm$^3$ |
| Flexural strength: | 120 MPa |
| Linear expansion coefficient (25–450° C.): | 50 ppm/° C. |
| Thermal deformation temperature: | 485° C. |
| Vacuum gas discharge properties (300° C.): | 3.3 × 10$^{-6}$ Torr · l/sec · cm$^2$ |

EXAMPLE 3

A 40 mm$\phi$×350 mmL molded body was obtained by filling polyimide resin particles into a 70 mm$\phi$×350 mmL rubber mold and performing direct CIP molding at room temperature and a pressure of 4 ton/cm$^2$ with a dry CIP apparatus by Kobe Steel Co., Ltd.

This was calcined without pressure in a nitrogen gas stream at 500° C. to obtain a molded body.

The properties of the obtained molded body were as follows.

| Polyimide molded body properties: | |
|---|---|
| Elongation: | 4.6% |
| Molded body density: | 1.32 g/cm$^3$ |
| Flexural strength: | 112 MPa |
| Linear expansion coefficient (25–450° C.): | 50 ppm/° C. |
| Thermal deformation temperature: | 485° C. |
| Vacuum gas discharge properties (300° C.): | 3.3 × 10$^{-6}$ Torr · l/sec · cm$^2$ |

EXAMPLE 4

A 10 mmw×77.5 mmL×2 mmt molded body was obtained by uniaxial molding of polyimide resin particles at room temperature and a pressure of 5 ton/cm$^2$, using a powder molding machine (SX-40) by Tamagawa Machinery Co., Ltd.

This was calcined without pressure in a nitrogen gas stream at 500° C. to obtain a molded body.

The properties of the obtained molded body were as follows.

| Polyimide molded body properties: | |
|---|---|
| Elongation: | 4.3% |
| Molded body density: | 1.32 g/cm$^3$ |
| Flexural strength: | 108 MPa |
| Linear expansion coefficient (25–450° C.): | 50 ppm/° C. |
| Thermal deformation temperature: | 485° C. |
| Vacuum gas discharge properties (300° C.): | 3.3 × 10$^{-6}$ Torr · l/sec · cm$^2$ |

EXAMPLE 5

The molded bodies obtained in Examples 1 to 4 were each heated at 250° C. for 12 hours for stress relaxation. The shape uniformity and dimensional precision of all the bodies were improved.

COMPARATIVE EXAMPLE 1

A molded body was obtained in the same manner as Example 1, except that the pressure during wet CIP molding was approximately 2 ton/cm$^2$ (196 MPa).

The obtained molded body had low flexural strength. The properties were as follows.

| Polyimide molded body properties: | |
|---|---|
| Molded body density: | 1.18 g/cm$^3$ |
| Flexural strength: | 76 MPa |

COMPARATIVE EXAMPLE 2

A molded body was obtained in the same manner as Example 2, except that the temperature during non-pressurized calcination in the nitrogen gas stream was 400° C.

The obtained molded body had low flexural strength. The properties were as follows.

| Polyimide molded body properties: | |
|---|---|
| Molded body density: | 1.32 g/cm³ |
| Flexural strength: | 67 MPa |

EXAMPLE 6

25% by weight of a synthetic diamond powder of 200 mesh was dry blended with 75% by weight of the polyimide fine particles as prepared and used in Example 1. The blend of the polyimide fine particles and the synthetic diamond powder was filled in a cavity of a die in which a stainless steel grinder substrate had been placed and single-screw press molded under a pressure of 98 MPa. The molded body was then enclosed in a polyethylene bag under vacuum and CIP molded under a pressure of 5 tons. Then, the molded body was calcined at 500° C. to obtain a grinder in which an abrasive grain layer of the polyimide molded body containing the synthetic diamond fine particles was firmly assembled to the stainless steel substrate.

The present invention having the construction described in detail above exhibits the following effects.

The process for production of polyimide molded bodies according to the invention can accomplish high temperature calcination of pressure molded bodies in the absence of pressure, thus allowing simultaneous calcination of a plurality of molded bodies and achieving high productivity as a result.

Furthermore, the molded bodies obtained by the present invention have high heat resistance and strength, low linear expansion coefficients and low moisture absorption.

What is claimed is:

1. A process for production of polyimide molded bodies which compii[]es a step in which a polyimide resin powder obtained by polymerization and imidation of p-phenylenediamine with 3,3',4,4'-biphenyltetracarboxylic acid, its ester or its dianhydride and 2,3,3',4'-biphenyltetracarboxylic acid, its ester or its dianhydride is molded at a pressure of approximately 3,000–5,000 kgf/cm² and at from room temperature to 200° C., and a step in which it is calcined at about 460–550° C. at a low pressure of 0.5–10 atmospheres and under a nonreactive gas stream.

2. The process of claim 1, wherein the proportion of aromatic tetracarboxylic acid components of the polyimide resin is 85–97 mole percent of a 3,3',4,4'-biphenyltetracarboxylic acid component and 15-3 mole percent of a 2,3,3',4'-biphenyltetracarboxylic acid component.

3. The process of claim 1, wherein the step of molding at a pressure of approximately 3,000–5,000 kgf/cm² is performed by the CIP (cold isostatic pressure) method.

4. The process of claim 3, wherein the CIP method is a wet CIP method or a dry CIP method.

5. The process of claim 1, wherein the step of calcination at about 460–550° C. is performed under atmospheric pressure.

6. The process of claim 1, wherein the step of calcination at about 460–550° C. is performed while raising the temperature to about 460° C. or above at a temperature elevating rate of 0.5–10° C./min.

7. The process of claim 1, wherein the body molding is followed by heating at 100–350° C. for approximately 30 minutes to 24 hours for stress relaxation treatment.

8. A polyimide molded body produced by the process of claim 1, wherein the density of the molded body is in the range of 1.28–1.34 g/cm³ and the vacuum gas discharge property of the molded body at 300° C. is about $10 \times 10^{-6}$ Torr·l/sec·cm² or less.

9. A polyimide molded body which is obtained by molding polyimide powder containing at least 70 mole percent of 3,3',4,4'-biphenyltetracarboxylic acid dianhydride component and at least 70 mole percent of a phenylenediamine component, by a molding method involving the CIP method, and which has a flexural strength of approximately 85 Mpa or greater and a vacuum gas discharge property at 300° C. of about $10 \times 10^{-6}$ Torr·l/sec·cm² or less.

10. A process of production of polyimide molded bodies which comprises molding polyimide powder containing at least 70 mole percent of 3,3',4,4'-biphenyltetracarboxylic acid dianhydride component and at least 70 mole percent of a phenylenediamine component, by a molding method involving the CIP method, wherein the resulting molded bodies have a flexural strength of approximately 85 Mpa or greater and a vacuum gas discharge property at 300° C. of about $10 \times 10^6$ Torr·l/sec·cm² or less.

11. A polyimide molded body produced by the process of claim 2, wherein the density of the molded body is in the range of 1.28–1.34 g/cm³ and the vacuum gas discharge property of the molded body at 300° C is about $10 \times 10^{-6}$ Torr·l/sec·cm² or less.

12. A polyimide molded body produced by the process of claim 3, wherein the density of the molded body is in the range of 1.28–1.34 g/cm³ and the vacuum gas discharge property of the molded body at 300° C. is about $10 \times 10^{-6}$ Torr·l/sec·cm² or less.

13. A polyimide molded body produced by the process of claim 4, wherein the density of the molded body is in the range of 1.28–1.34 g/cm³ and the vacuum gas discharge property of the molded body at 300° C. is about $10 \times 10^{-6}$ Torr·l/sec·cm² or less.

14. A polyimide molded body produced by the process of claim 5, wherein the density of the molded body is in the range of 1.28–1.34 g/cm³ and the vacuum gas discharge property of the molded body at 300° C. is about $10 \times 10^{-6}$ Torr·l/sec·cm² or less.

15. A polyimide molded body produced by the process of claim 6, wherein the density of the molded body is in the range of 1.28–1.34 g/cm³ and the vacuum gas discharge property of the molded body at 300° C. is about $10 \times 10^{-6}$ Torr·l/sec·cm² or less.

16. A polyimide molded body produced by the process of claim 7, wherein the density of the molded body is in the range of 1.28–1.34 g/cm³ and the vacuum gas discharge property of the molded body at 300° C. is about $10 \times 10^{-6}$ Torr·l/sec·cm² or less.

* * * * *

UNITED STATES PATENT AND TRADEMARK OFFICE
CERTIFICATE OF CORRECTION

PATENT NO. : 6,555,647 B2
DATED : April 29, 2003
INVENTOR(S) : Tatsuo Tsumiyama

It is certified that error appears in the above-identified patent and that said Letters Patent is hereby corrected as shown below:

Column 9,
Lines 36-46, should read -- A process for production of polyimide molded bodies which comprises a step in which a polyimide resin powder obtained by polymerization and imidation of p-phenylenediamine with 3,3',4,4'-biphenyltetracarboxylic acid, its ester or its dianhydride and 2,3,3',4'-biphenyltetracarboxylic acid, its ester or its dianhydride is molded at a pressure of approximately 3,000-5,000 kgf cm$^2$ and at from room temperature to 200° C., and a step in which it is calcined at a about 460-550° C. at a low pressure of 0.5-10 atmospheres and under a nonreactive gas stream. --

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,555,647 B2
DATED : April 29, 2003
INVENTOR(S) : Tatsuo Tsumiyama

It is certified that error appears in the above-identified patent and that said Letters Patent is hereby corrected as shown below:

Column 9,
Lines 36-46, should read -- A process for production of polyimide molded bodies which comprises a step in which a polyimide resin powder obtained by polymerization and imidation of p-phenylenediamine with 3,3',4,4'-biphenyltetracarboxylic acid, its ester or its dianhydride and 2,3,3',4'-biphenyltetracarboxylic acid, its ester or its dianhydride is molded at a pressure of approximately 3,000-5,000 $kgf/cm^2$ and at from room temperature to 200° C., and a step in which it is calcined at about 460-550° C. at a low pressure of 0.5-10 atmospheres and under a nonreactive gas stream. --

This certificate supersedes Certificate of Correction issued April 26, 2005.

Signed and Sealed this

Twenty-sixth Day of July, 2005

JON W. DUDAS
*Director of the United States Patent and Trademark Office*